United States Patent [19]

Miller et al.

[11] Patent Number: 4,781,748

[45] Date of Patent: Nov. 1, 1988

[54] AQUEOUS NITROGENOUS FERTILIZER SOLUTIONS HAVING REDUCED CORROSIVITY

[75] Inventors: Richard F. Miller, Humble; Marilyn W. Blaschke, Pearland, both of Tex.

[73] Assignee: Pony Industries, Inc., New York, N.Y.

[21] Appl. No.: 919,955

[22] Filed: Oct. 17, 1986

[51] Int. Cl.$^4$ .................. C05G 3/00; C05G 1/02; C05G 5/02

[52] U.S. Cl. ............................ 71/28; 71/59; 71/64.01; 71/904; 422/12; 422/15

[58] Field of Search ............ 71/64.01, 64.12, DIG. 4, 71/59, 28, 902; 422/12, 14, 15

[56] References Cited

U.S. PATENT DOCUMENTS 4,159,901 7/1979 Beestman et al. ................ 422/14 X
4,313,847 2/1982 Chasin et al. ..................... 71/64.01
4,356,020 10/1982 Grunert et al. .................... 71/64.12

*Primary Examiner*—Ferris H. Lander
*Attorney, Agent, or Firm*—J. R. Magnone; A. J. Good

[57] ABSTRACT

The corrosive effects of liquid nitrogen-based fertilizer compositions on metal surfaces is reduced by adding to the fertilizer compositions small amounts of amine oxides.

14 Claims, No Drawings

AQUEOUS NITROGENOUS FERTILIZER SOLUTIONS HAVING REDUCED CORROSIVITY

FIELD OF THE INVENTION

This invention relates to the inhibition of metal corrosion and more particularly to the inhibition of corrosion of metals in contact with aqueous nitrogenous fertilizer solutions.

BACKGROUND OF THE INVENTION

Aqueous nitrogen-based fertilizers are widely used in agriculture because of their ease of application and effectiveness. The corrosivity of such fertilizer solutions has been a major problem associated with the handling of these materials. Such fertilizer solutions cause severe corrosion of liquid fertilizer handling system components, such as metal mixing and storage vessels, pumps, valves and pipes. The need for special precautions in the handling of aqueous nitrogenous fertilizer solutions and the high cost of special materials such as stainless steel vessels and lines adds considerably to the expense of storing and transporting these products. The term "nitrogenous fertilizer" is used herein to mean nitrogen-containing compounds that have a nutritive effect on plants. Nitrogenous fertilizers include ammonia; ammonium salts, such as ammonium nitrate, ammonium sulfate, ammonium phosphate, etc.; nitrates, such as potassium nitrate, sodium nitrate, etc.; organic nitrogen-based compounds, such as urea, ammonium carbamate, etc.; and mixtures of these. Aqueous solutions of these compounds generally have a highly corrosive effect on various metals, particularly ferrous metals and aluminum.

Many attempts have been made to eliminate or at least reduce the corrosive effect of nitrogenous fertilizer solutions on metal parts and equipment. Various chemical treatments have been tried with varying degrees of success. For example, U.S. Pat. No. 2,680,766 teaches that corrosion of chromium steel alloy equipment that is used in the manufacture of urea from carbon dioxide which contains small amounts of sulfur can be reduced by introducing small amounts of copper to the system. This patent also states that the amount of oxygen in the reactants should be less than 10 parts per million parts of reactants (ppm). U.S. Pat. No. 3,230,070 teaches the use of cupric amines to inhibit the corrosive characteristics of aqueous solutions of nitrogenous materials. U.S. Pat. No. 3,466,192 teaches contacting metal surfaces with soluble methylol thiourea compounds an oxidizing acid solution. Included in the oxidizing acid systems disclosed in this patent are mixtures of hydrogen peroxide and hydrofluoric acid or hydrochloric and nitric acids. U.S. Pat. No. 3,720,548 discloses the use of small amounts of an oxidizing agent, such as oxygen, air or hydrogen peroxide to render austenitic stainless steels less susceptible to corrosive attack by aqueous ammonium carbamate and urea solutions. The metal is first exposed to the aqueous carbamate solution and then it is contacted with the oxidizing agent. Several patents teach the introduction of air or oxygen to a reactor in which urea is made to inhibit corrosion caused by the reactants or products. For example U.S. Pat. Nos. 2,727,069, 3,137,724 and 3,574,738 teach inhibiting the corrosive effects of ammonium carbamate and urea solutions on metal surfaces of reactors used to synthesize these compounds by introducing small amounts of oxygen into the reactors during the synthesis. U.S. Pat. No. 2,959,556 teaches that metal surfaces can be protected against the corrosive effects of halogenated hydrocarbons and their hydrocarbon solutions by adding to these liquids small amounts of organic peroxides.

The above patents disclose techniques which improve the protection of metal surfaces against the corrosive effects of nitrogenous materials. However aqueous nitrogenous solutions are so corrosive that new and improved methods for protecting metal surface from their corrosive effects are continuously being sought.

OBJECTS OF THE INVENTION

It is an object of the invention to present novel aqueous nitrogenous fertilizer solutions which have a reduced tendency to corrode metal equipment surfaces. It is another object of the invention to present a method of inhibiting the corrosive action of aqueous nitogenous fertilizer liquids on metal surfaces. These and other objects of the invention are supported the following description and examples.

SUMMARY OF THE INVENTION

The corrosive activity of aqueous nitrogenous fertilizer solutions on metal surfaces is significantly reduced by incorporating into the solutions small amounts of one or more amine oxides. The preferred amine oxides are alkyl amine oxides in which each alkyl group has 1 to 18 carbon atoms. The amine oxides are generally added to the fertilizer solutions at concentrations of about 1 to about 1000 ppm. The preferred concentration range of the amine oxide in the fertilizer solutions is about 5 to about 500 ppm.

DETAILED DESCRIPTION OF THE INVENTION

The compositions which are inhibited in accordance with this invention are aqueous nitrogenous fertilizer solutions. These compositions may be formulated from any of the above-described nitrogenous compounds. They may contain various concentrations of these nitrogenous materials and may also contain other plant nutrients or treatment chemicals. The formulation of the solutions may vary depending upon the intended application of the fertilizer solutions. The concentration of the nitrogenous compounds in the aqueous solution may vary from very concentrated solutions to very dilute solutions. It is generally preferred to prepare these solutions as concentrated solutions, for example containing about 15 weight percent water and 85 weight percent active components, since these can be more economically handled and shipped. However, the solutions were usually diluted to much lower concentrations before their use in fertilizer applications.

The compounds used in this invention to inhibit corrosion are amine oxides. Any water-soluble amine oxide which does not interfere with the intended use of the fertilizer solution can be used in the invention.

Amine oxides which are considered useful in the invention have the structural formula

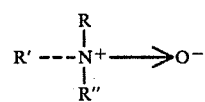

wherein R, R' and R" are identical or different hydrocarbon radicals, including straight- or branched-chain alkyl groups each having 1 to 24 or more carbon atoms and aromatic groups having 6 to 24 carbon atoms. The term "aromatic group" is defined to include compounds containing only an aromatic nucleus, such as the phenyl radical, compounds containing aromatic substituted alkyl groups, such as the benzyl radical, and alkyl-substituted aromatic compounds, such as the tolyl radical. The number of carbon atoms in each group is not critical and the number is dictated by commercial availability. Preferred amine oxides are those having 1 to 18 alkyl carbon atoms in each alkyl group and a total of 3 to 24 carbon atoms in all three alkyl groups or in the case of aryl groups, 6 to 18 carbon atoms. It is sometimes preferred to use amine oxides that have one long chain alkyl group and two short chain alkyl groups. For example one alkyl group may have 8 to 18 carbon atoms and the other two alkyl groups may have 1 to 6 carbon atoms. Typical alkyl amine oxides include trimethyl amine oxide, triethyl amine oxide, tridodecyl amine oxide, dimethylethyl amine oxide, methylethylpropyl amine oxide, dimethylhexyl amine oxide, dimethylhexyadecyl amine oxide, trieicosyl amine oxide, etc. Preferred amine oxides include trimethyl amine oxide, dimethylethyl amine oxide, dimethyldodecyl amine oxide, etc. Typical aryl amine oxides include triphenyl amine oxide, tri p-methylphenyl amine oxide N,N,N-dimethylphenyl amine oxide, N,N,N-ethyldiphenyl amine oxide, etc.

The preparation of the amine oxides is not a part of the invention. The amine oxides can be prepared by well known commercial methods, such as by the reaction of tertiary amines with hydrogen peroxide or they may be purchased. Amine oxides are commercially available from Armak division of Armour, Inc. under the trademark DCW and from Lonza Chemical Company under the trademark Barlox ™. It is preferably to use water-soluble amine oxides since these will provide more uniform protection of metal surfaces exposed to the fertilizer solutions.

The amine oxide is added at a concentration which will provide the desired degree of protection of metal surfaces in contact with the fertilizer solution. The optimum amount of amine oxide to be added will depend upon the particular compounds present in the aqueous fertilizer solution, the concentration of nitrogenous fertilizer in the solution, the particular metals exposed to the fertilizer solutions and the particular amine oxides used. In general, to provide adequate protection it is generally necessary that the amine oxide be present in the fertilizer solution at a concentration of at least 5.0 parts by weight of amine oxide per million parts by weight of fertilizer solution (ppm). It is preferred that the amine oxides be present in concentrations of at least 10 ppm. The amine oxides may be present in amounts up to 5000 ppm or higher, but it is generally not necessary that the concentration exceed about 5000 ppm. Most often adequate protection can be obtained with amine oxide concentrations of up to about 1000 ppm. In other words, the amine oxide concentration in the fertilizer is generally maintained in the range of about 5 to 5000 ppm and preferably in the range of about 10 to 1000 ppm.

The point and method of addition of the amine oxide to the fertilizer solution is a matter of choice. It is advantageous to incorporate the amine oxide into the solution as soon as possible after production. In this way equipment which is used to store or transport the fertilizer product can be protected. The amine oxide may be added in one addition or it may be added in multiple additions. The latter alternative is useful for replenishing the amine oxide as it becomes depleted or if the fertilizer is transferred to a different container.

The following examples illustrate specific embodiments of the invention. Unless otherwise indicated, parts and percentages are on a weight basis. A commercial aqueous fertilizer solution containing 32 weight percent nitrogen comprised approximately of 35 weight percent urea, 45 weight percent ammonium nitrate, and 20 weight percent water was used in the examples. The corrosion rates set forth in the table below were determined from the weight loss of metal coupons, which were suspended completely immersed in the samples during the test period, according to the following equation:

$$\text{Corrosion Rate} = \frac{534 \times \Delta W}{A \times d \times t}$$

where the corrosion rate is in mils per year (mpy), $\Delta W$ is the weight loss in milligrams, A is the surface area of the coupon in square inches, d is the density of the sample in grams per cubic centimeter and t is the total time in hours that the coupon is immersed in the sample.

EXAMPLE I

Several 400 ml samples of the above-described urea-ammonium nitrate solution were prepared for corrosion testing as follows. The samples were purged with nitrogen for 15 minutes and to each sample except one, designated as a control, was added 300 ppm of a 30 weight percent aqueous solution of an alkyldimethylamine oxide (90 ppm of the alkyldimethylamine oxide), as indicated in the table. A pre-weighed 1020 mild steel coupon having dimensions of $3'' \times \frac{1}{2}'' \times 1/16''$ and having a $\frac{1}{8}''$ diameter handling hole was suspended in each sample and the sample containers were sealed and stored for 24 hours in a water bath maintained at 80° C. The coupons were then removed from the sample containers, washed with distilled water, dried and reweighed. The corrosion rate was determined from the weight loss by means of the above equation. The results are tabulated in the following table.

TABLE

| Sample | Inhibitor (Conc., ppm) | Corrosion Rate, mpy |
| --- | --- | --- |
| Control | None | 1428.8 |
| 1 | coca-amine oxide[1] (300) | 2.72 |
| 2 | decylamine oxide[2] (300) | 2.05 |
| 3 | steara-amine oxide[3] (300) | 7.20 |

[1] sold by Lonza Chemical under the trademark Barlox ® 12
[2] sold by Lonza Chemical under the trademark Barlox ® 10S
[3] sold by Lonza Chemical under the trademark Barlox ® 18S The results tabulated in the above table show the beneficial results obtained by use of the corrosion inhibitors of the invention. The control sample, which did not contain an inhibitor, exhibited high corrosivity. The samples containing very small amounts of alkyldimethyl amine oxides exhibited very little tendency to corrode the mild steel coupons.

Although the invention is illustrated by specific examples, it is understood that variations of these are contemplated. For instance, combinations of two or more amine oxides may be used to inhibit corrosion of the fertilizer solutions. The scope of the invention is limited only by the breadth of the appended claims.

What is claimed is:

1. An aqueous fertilizer composition comprised of at least one nitrogenous compound which is useful as a plant fertilizer and a corrosion inhibiting amount of at least one amine oxide having the structural formula

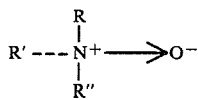

wherein R, R' and R" are identical or different hydrocarbon radicals selected from straight- or branched-chain alkyl groups each having 1 to 24 carbon atoms, unsubstituted or alkyl-substituted aromatic radicals having 6 to 24 carbon atoms or mixtures of these.

2. The aqueous fertilizer composition of claim 1 wherein R, R' and R" each have 1 to 18 carbon atoms.

3. The aqueous fertilizer composition of claim 2 wherein the amine oxide is present in an amount in the range of about 5 to about 5000 ppm.

4. The aqueous fertilizer composition of either claims 1 or 3 wherein the total number of carbon atoms in the amine oxide is 3 to 24.

5. The aqueous fertilizer composition of claim 3 wherein R has 8 to 18 carbon atoms and R' and R" each have 1 to 6 carbon atoms.

6. The composition of claim 4 wherein the amine oxide is present in an amount in the range of about 10 ppm to about 1000 ppm.

7. The composition of claim 3 wherein the nitrogenous compund is selected from ammonia, ammonium nitrate, ammonium carbamate, urea, ammonium phosphate, sodium nitrate, potassium nitrate and mixtures of these.

8. A method of reducing the corrosivity of aqueous nitrogenous fertilizer compositions on metals comprising adding to said fertilizer composition at least one amine oxide having the structural formula

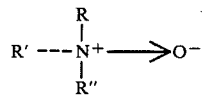

wherein R, R' and R" are identical or different hydrocarbon radicals selected from straight- or branched-chain alkyl groups each having 1 to 24 carbon atoms, unsubstituted or alkyl-substituted aromatic radicals having 6 to 24 carbon atoms or mixtures of these in an amount sufficient to substantially inhibit corrosion of metal surfaces which come in contact with said fertilizer compositions.

9. The method of claim 8 wherein R, R' and R" each have 1 to 18 carbon atoms.

10. The method of claim 9 wherein the amine oxide is present in an amount in the range of about 5 to about 5000 ppm.

11. The method of either of claims 8 or 10 wherein the total number of carbon atoms in the amine oxide is 3 to 24.

12. The method of claim 11 wherein wherein R has 8 to 18 carbon atoms and R' and R" each have 1 to 6 carbon atoms.

13. The method of claim 11 wherein the amine oxide is present in an amount in the range of about 10 ppm to about 1000 ppm.

14. The method of claim 11 wherein the nitrogenous compound is selected from ammonia, ammonium nitrate, ammonium carbamate, urea, ammonium phosphate, sodium nitrate, potassium nitrate and mixtures of these.

* * * * *